United States Patent
Keene

(10) Patent No.: US 8,734,932 B2
(45) Date of Patent: May 27, 2014

(54) DRAINAGE MAT

(75) Inventor: James R. Keene, Pepper Pike, OH (US)

(73) Assignee: Keene Building Products Co., Inc., Mayfield Heights, OH (US)

(*) Notice: Subject to any disclaimer, the term of this patent is extended or adjusted under 35 U.S.C. 154(b) by 45 days.

(21) Appl. No.: 13/007,774

(22) Filed: Jan. 17, 2011

(65) Prior Publication Data
US 2012/0183744 A1 Jul. 19, 2012

(51) Int. Cl.
B32B 3/28 (2006.01)

(52) U.S. Cl.
USPC ........... 428/193; 428/218; 428/175; 428/166; 428/178; 428/188; 52/793.1; 52/408; 181/288; 181/293

(58) Field of Classification Search
USPC ......... 428/175, 166, 171, 178, 188, 193, 218; 52/408, 793.1; 181/288, 293
See application file for complete search history.

(56) References Cited

U.S. PATENT DOCUMENTS

| | | | |
|---|---|---|---|
| 1,434,915 A | 11/1922 | Scholfield | |
| 1,799,750 A | 4/1931 | Hummert | |
| 2,104,872 A | 1/1938 | Levy | |
| 3,423,284 A * | 1/1969 | Gneisz et al. | 162/157.7 |
| 3,435,577 A | 4/1969 | O'Leary | |
| 4,177,312 A | 12/1979 | Rasen et al. | |
| 4,211,807 A | 7/1980 | Yazawa et al. | |
| 4,558,552 A | 12/1985 | Reitter, II | |
| 4,617,219 A * | 10/1986 | Schupack | 428/113 |
| 4,815,963 A | 3/1989 | Berkhout | |
| 5,596,853 A | 1/1997 | Blaney et al. | |
| 5,839,241 A | 11/1998 | Cacossa et al. | |
| 6,151,855 A | 11/2000 | Campbell | |
| 6,171,984 B1 | 1/2001 | Paulson et al. | |
| 6,355,333 B1 | 3/2002 | Waggoner et al. | |
| 6,594,965 B2 | 7/2003 | Coulton | |
| 6,745,531 B1 | 6/2004 | Egan | |
| 6,804,922 B1 * | 10/2004 | Egan | 52/408 |
| 6,901,713 B2 | 6/2005 | Axsom | |
| 6,918,218 B2 | 7/2005 | Greenway | |
| 6,990,775 B2 | 1/2006 | Koester | |
| 7,070,678 B2 | 7/2006 | Allen et al. | |
| 7,338,700 B2 | 3/2008 | McKenna et al. | |
| 7,607,270 B2 | 10/2009 | Ehrman et al. | |
| 7,655,104 B2 | 2/2010 | McKenna et al. | |
| 2002/0170648 A1 | 11/2002 | Dinkel | |
| 2003/0102098 A1 | 6/2003 | Allen et al. | |
| 2004/0025465 A1 * | 2/2004 | Aldea et al. | 52/514 |
| 2004/0182028 A1 | 9/2004 | Belleau | |
| 2005/0136225 A1 | 6/2005 | McKenna et al. | |
| 2005/0144901 A1 | 7/2005 | Egan et al. | |

(Continued)

OTHER PUBLICATIONS

U.S. Appl. No. 13/007,755, filed Jan. 2011, Keene.

*Primary Examiner* — Aaron Austin
*Assistant Examiner* — Tahseen N Khan
(74) *Attorney, Agent, or Firm* — Renner, Otto, Boisselle & Sklar, LLP

(57) ABSTRACT

A drainage mat for use in building structures, particularly in exterior walls and roofing, to improve drainage and ventilation within such structures. The drainage mat includes a web of extruded polymer monofilaments that are heat welded at junctions to form a matrix of tangled monofilaments. The web includes on its front face an alternating array of ridges and planar regions, each ridge having a substantially trapezoidal shape with a top surface and a base, the width of the top surface being less than the width of the base.

17 Claims, 5 Drawing Sheets

(56) References Cited

U.S. PATENT DOCUMENTS

2005/0183346 A1* 8/2005 Dudley et al. .................... 52/60
2006/0051560 A1* 3/2006 McKenna et al. ............. 428/174
2007/0261365 A1 11/2007 Keene
2009/0320399 A1 12/2009 Ehrman et al.

* cited by examiner

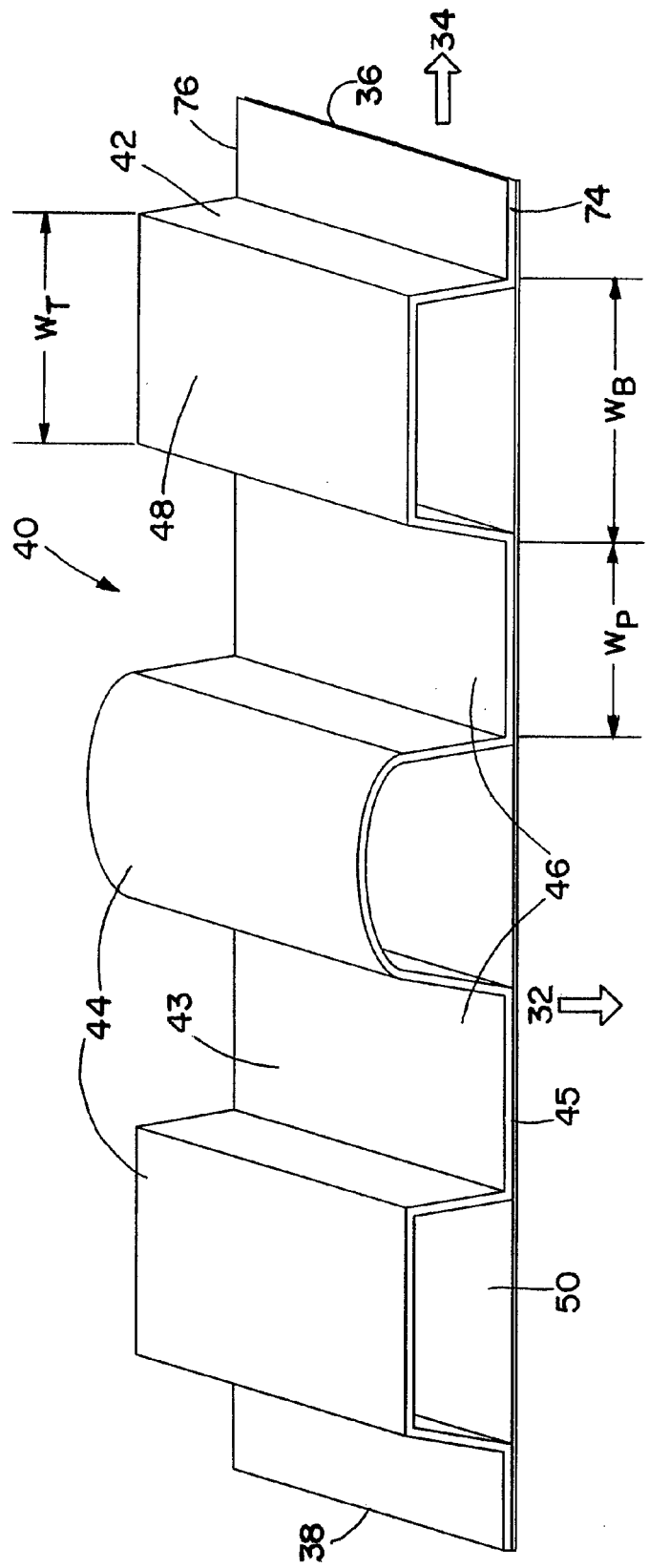
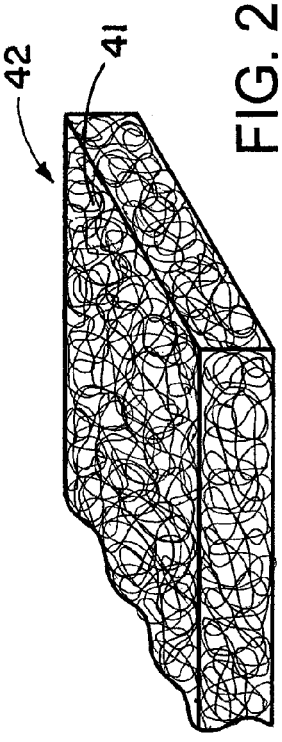
FIG. 1
FIG. 2

DRAINAGE MAT

TECHNICAL FIELD

The present invention relates to drainage and ventilation mats for use in building structures, particularly in exterior walls and roofing.

BACKGROUND

In exterior walls of building structures, such as houses or commercial buildings, there are a number of locations within the building structure where ambient moisture-laden air may become relatively trapped in still air. In time, the trapped moisture-laden air may condense in droplets or drops on adjacent surfaces of masonry, wood or metal which may not be visible to an observer or exposed for treatment. There has been substantial development of devices and arrangements for leading moisture away from relatively trapped areas in masonry and other types of building construction in an effort to overcome this problem.

SUMMARY

In one aspect of the invention there is provided a drainage mat that includes a web of extruded polymer monofilaments, the polymer monofilaments being heat welded at junctions to form a matrix of tangled monofilaments. The web having a front face, a rear face, a top edge and a bottom edge, and a pair of side edges. The front face has an alternating array of ridges and planar regions, the ridges and planar regions extending from the top edge to the bottom edge, each ridge having a substantially trapezoidal shape with a top surface and a base, the width of the top surface being less than the width of the base.

In one embodiment, the width of top surface of the ridges is less than the width of the planar regions.

In one embodiment, at least one of the ridges has a planar top surface. In one embodiment, at least one of the ridges has a dome shaped top surface.

The polymer monofilaments may be are made of a material selected from polyolefin, polyamide, polyester, polyvinylhalide, polystyrene, polyvinylester and a mixture of two or more thereof. In one embodiment, the polymer monofilaments are made of a material selected from polyethylene, polypropylene, and a mixture thereof.

The drainage mat may include a fabric layer heat bonded to the rear face of the web. The fabric layer may be made of a plurality of fiberglass strands. In one embodiment, the fabric layer includes at least one selvedge edge that extends beyond at least one of the side edges of the web.

The polymer monofilaments of the web may have an average diameter in the range from about 1 to about 4 mils.

The drainage mat may further include a waterproof membrane bonded to the front face of the web.

In one embodiment, at least one of the side edges of the monofilament web of the drainage mat has an entangled filament hook.

In one embodiment of the drainage mat, the top edge of the web is cut at an angle and the bottom edge of the web is cut at a supplementary angle.

In one embodiment, the front face of the web may be bonded to an insulation board having the same dimensions as the monofilament web.

In an aspect of the invention, there is provided a drainage system that includes at least two adjacent drainage mats. The at least two adjacent drainage mats may be interlocked at adjacent side edges with the entangles filament hooks.

BRIEF DESCRIPTION OF THE DRAWINGS

In the annexed drawings like parts and features have like references. The drawings are schematic illustrations which may not necessarily be drawn to scale.

FIG. 1 is a perspective view of an embodiment of the drainage mat of the present invention, which includes a series of ridges projecting from the plane of the drainage mat.

FIG. 2 is a view of a portion of the web formed from tangled polymer monofilaments.

DETAILED DESCRIPTION

Figure 3A:
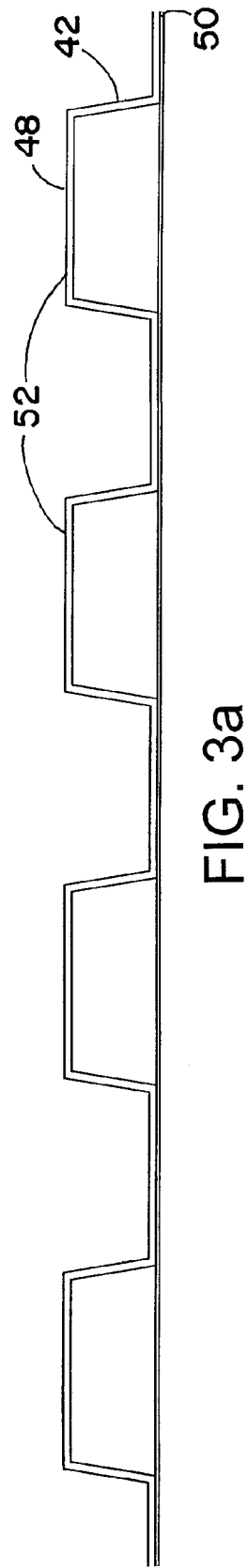
FIGS. 3a-3c are cross-sectional views of embodiments of the drainage mat of FIG. 1.

All numerical ranges disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The term "machine direction" refers to the direction of the flow of polymer from an extruder when forming the inventive drainage mat.

The term "cross-direction" refers to the direction that is oriented 90° from the machine direction.

Referring to FIGS. 1 and 2 the inventive drainage mat 40, in its illustrated embodiment, includes a thin monofilament web 42 that is shaped into an array of alternating ridges 44 and planar regions 46. The web has a front face 43, a rear face 45, a top edge 74, a bottom edge 76, and side edges 36, 38.

As shown in FIG. 2, the web 42 is formed from a plurality of extruded polymer monofilaments 41. The monofilaments 41 are welded at junctions to form a matrix of the polymer monofilaments 41. The monofilaments 41 of web 42 may be made from any thermoplastic polymer that provides the desired properties of strength and resilience when used in the inventive drainage mat. The monofilaments 41 may be made of a polyolefin (e.g., polyethylene, polypropylene, etc.), polyamide (e.g., Nylon), polyester, polyvinylhalide (e.g., polyvinylchloride (PVC), polyvinylidene chloride, polyvinyltetrafluoride, polyvinyl chlorotrifluoride), polystyrene, polyvinylester (e.g., polyvinyl acetate, etc.) or a mixture of two or more thereof. The monofilaments 41 are extruded onto a substrate having the desired structural profile to form the web 42.

The ridges 44 have an elongated trapezoidal shape, with the width WT of top surface 48 of the ridge 44 being less than the width of the base WB of the ridge 44. Between the ridges 44 are planar regions 46 connecting adjacent 5 ridges 44. In one embodiment, the width WP of the planar regions 46 is greater than the width WT of the top surface 48 of the ridges 44. The drainage mat 40 may include a fabric layer 50 underlying the monofilament web 42. The rear face 45 of the web 42 is in contact with the fabric layer 50 in planar regions 46. The front face 43 of the web 42 projects 10 away from the fabric layer 50.

Figure 3B:
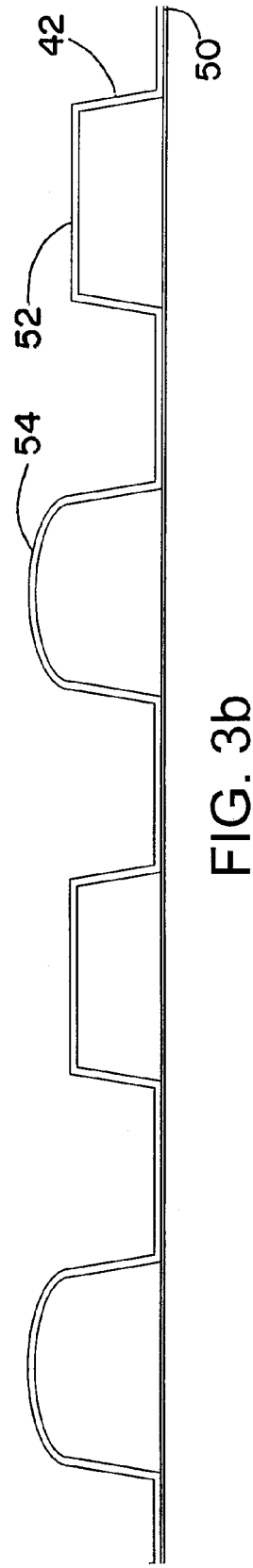
Figure 3C:
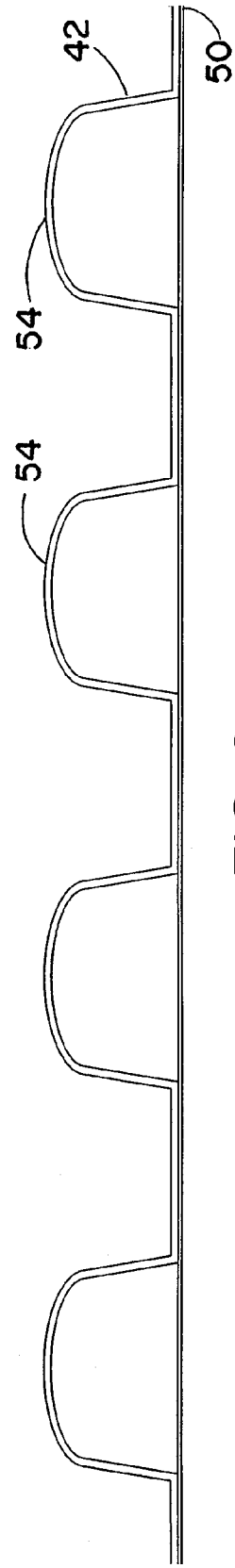

Referring to FIGS. 3a-3c, examples of various cross-sections of the monofilament web 42 are illustrated. The top surface 48 of one or more of the ridges 44 may be flat. The top surface 48 of one or more of the ridges 44 may be convex or domed shaped. As shown in FIG. 3a, all of the ridges 44 may have a flat top surface 52. As illustrated in FIG. 3b, ridges 44 having a flat top surface 52 may be alternated with ridges having a domed top surface 54. The pattern of ridges having a flat top surface 52 and those having a domed top surface 54 may be varied such that, for example, the ridges having a domed top surface 52 may be every other ridge, or every fourth ridge, or every fifth ridge, and so on. In the embodiment illustrated in FIG. 3c, the top surface of all of the ridges 44 have a domed top surface 54.

Figure 4:
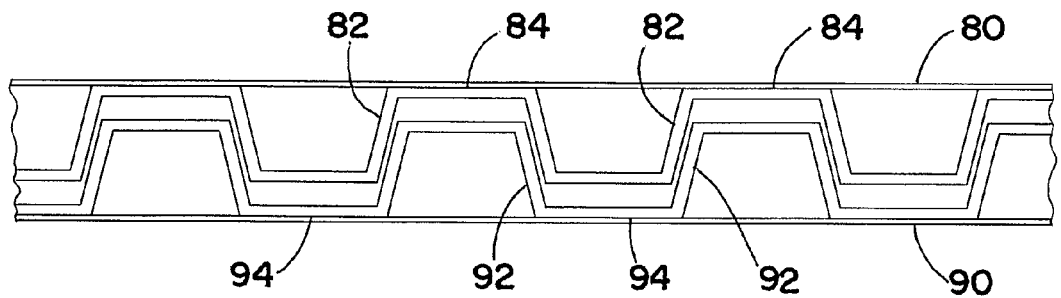
FIG. 4 is a cross-sectional view of nesting drainage mats.

The shape of the ridges 44 may be configured so that when a first drainage mat is placed facing a second drainage mat with the fabric layer of each mat facing outward, the ridges of the first mat can nest between the ridges of the second mat. This nesting effect facilitates transport of the drainage mats to the installation site, utilizing less volume, and resulting in reduced shipping costs. FIG. 4 shows a first mat 80 overlying a second mat 90, the first and second mats facing each other. The ridges 82 of the first mat 80 fit into the planar regions 94 of the second mat 90, and the ridges 92 of the second mat 90 fit into the planar regions 84 of the first mat 80.

The drainage mat 40 is generally provided in panel form. The drainage mat 40 is not provided in roll form. In one embodiment, the drainage mat 40 panel has the dimensions of 4 ft.×16 in. In another embodiment, the length of the panel may be up to 8 ft., and the width may be up to 24 in.

The fabric layer 50 of the drainage mat 40 is preferably constructed of fiberglass or a similar material, even more preferably a material displaying resistance to environmental exposure (e.g., alkaline conditions, and the like). In one embodiment, the fabric layer 50 includes a fiberglass layer and a polymer coating. The fiberglass layer may be a woven layer. The fiberglass layer has a plurality of fiberglass strands extending parallel to one another in the machine direction 32, and a plurality of fiberglass strands extending parallel to one another in the cross-direction 34. The fiberglass strands intersect one another at angles of about 90°. The strands may be referred to as yarns. The strands may be aligned in a side-by-side configuration or in an over/under configuration. The polymer coating provides a binding to hold the strands together in the fabric layer 50.

The fiberglass strands may each comprise a plurality of fiberglass filaments. The fiberglass filaments may be combined with filaments of another material, for example, a polymer such as polyester. The average diameter of the fiberglass strands may be in the range from about 10 to about 200 mils, and in one embodiment in the range from about 20 to about 40 mils. The number of fiberglass strands extending in the machine direction 32 may be in the range from about 1 to about 20 strands per inch of fabric layer 50 as measured in the cross-direction 34, and in one embodiment in the range from about 6 to about 10 strands per inch, and in one embodiment about 7 or 8 strands per inch. The number of fiberglass strands extending in the cross-direction 34 may be in the range from about 1 to about 20 strands per inch of fabric layer 50 as measured in the machine direction 32, and in one embodiment in the range from about 6 to about 10 strands per inch of fabric layer as measured in the machine direction 32, and in one embodiment about 7 or about 8 strands per inch.

Figure 5:
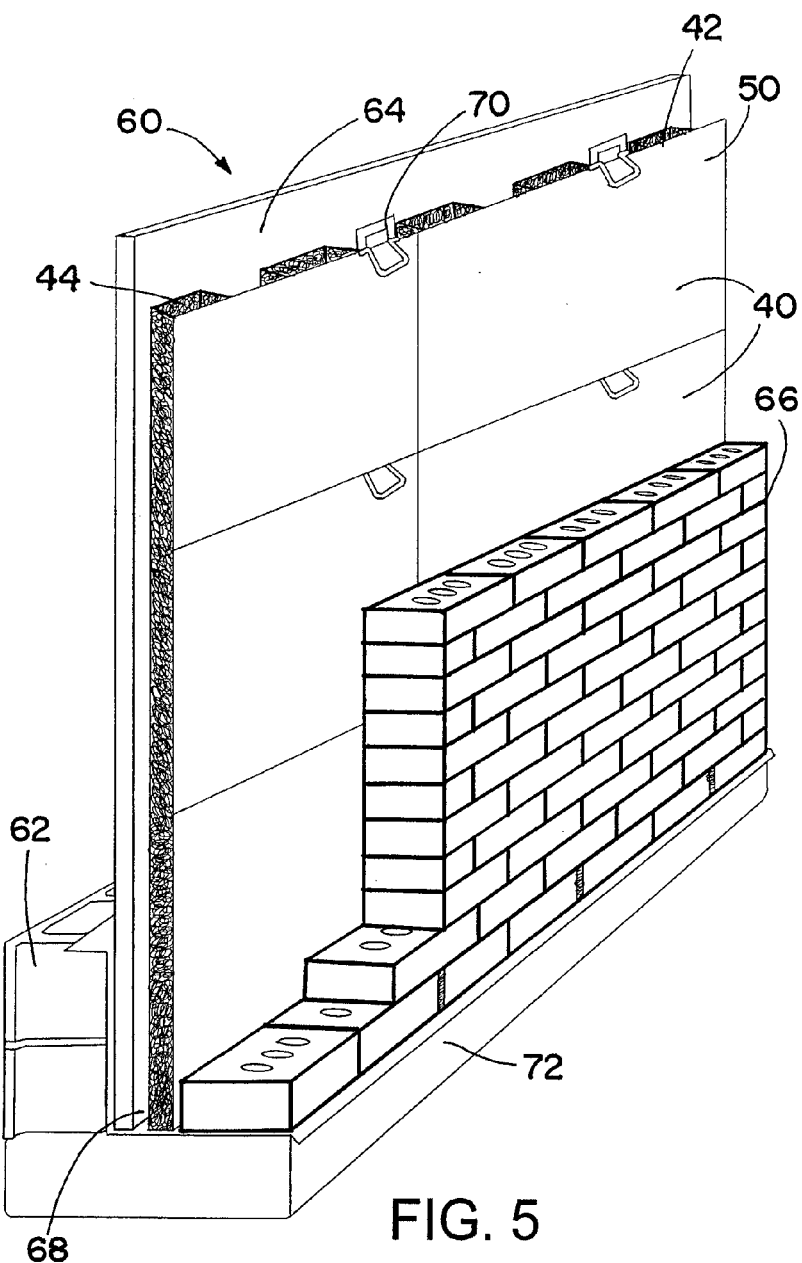
FIG. 5 is a perspective view of an exterior wall construction for a building incorporating the drainage mat panels according to an embodiment of the present invention.

Referring to FIG. 5, an exterior wall assembly 60 of a building includes drainage mat panels 40 for providing ventilation and drainage passageways for the free flow of air, vapor and liquids to ensure that moisture is prevented from accumulating. The wall assembly 60 includes an inner wythe of masonry blocks 62 and an outer wythe of facing brick 66 on top of foundation 72. An insulator layer 64 may be installed adjacent the inner wythe of masonry blocks 62. Between the inner wythe 62 and outer wythe 66, a cavity 68 is formed. Drainage mat panels 40 are positioned within the cavity 68 with the fabric layer 50 facing the outer wythe 66 so as to prevent mortar intrusion into the cavity 68. The ridges of the drainage mat are oriented in a vertical direction to provide channels for drainage.

The thickness of the drainage mat 40 is typically greater than 0.75 in. The drainage mat 40 fills the cavity 68. The width of the cavity 68 behind the outer brick wythe 66 is most typically within the range of about 1 inch to about 2 inches, but may be as wide as 4 inches. The thickness of the drainage mat 40 is adjusted accordingly to accommodate the width of the cavity into which it is installed. The drainage mat panels may be sized to fit between brick masonry ties 70, which are typically spaced in horizontal rows and no more than every 24 inches vertically up the height of the wall.

The ridges 40 of the drainage mat face the inner wythe 62. The dome shaped top surface 54 of ridges 44 can accommodate irregularities in the masonry cavity 68. The dome shaped top surface 54 of the ridges 44 may be compressed against the inner wythe 62 to press the fabric layer 50 toward the outer wythe 66, inhibiting the mortar from pushing into the cavity 68.

Figure 6:
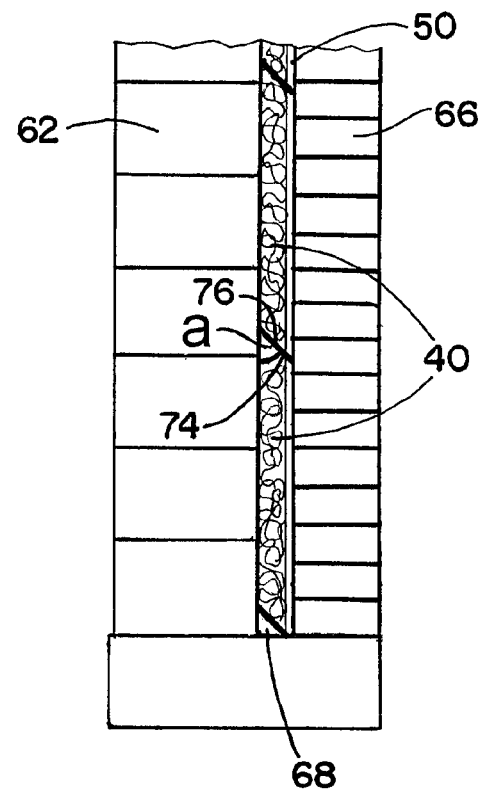
FIG. 6 is a cross-sectional view of an exterior wall construction with a plurality of stacked drainage mat panels.

In one embodiment, the top and bottom edges of the drainage mat panels are cut at an angle to hold the stacked panels in place against each other. Referring to FIG. 6, a column of stacked drainage panels 40 are positioned within the cavity 68 between the inner wythe 62 and the outer wythe 66. The top edge 74 of each panel 40 is cut at an angle (a) and the bottom edge 76 of each panel 40 is cut at a supplementary angle (180°—a), to create a wedge that facilitates holding the upper panel to the lower panel as the panels are stacked within the cavity 68.

Figure 7:
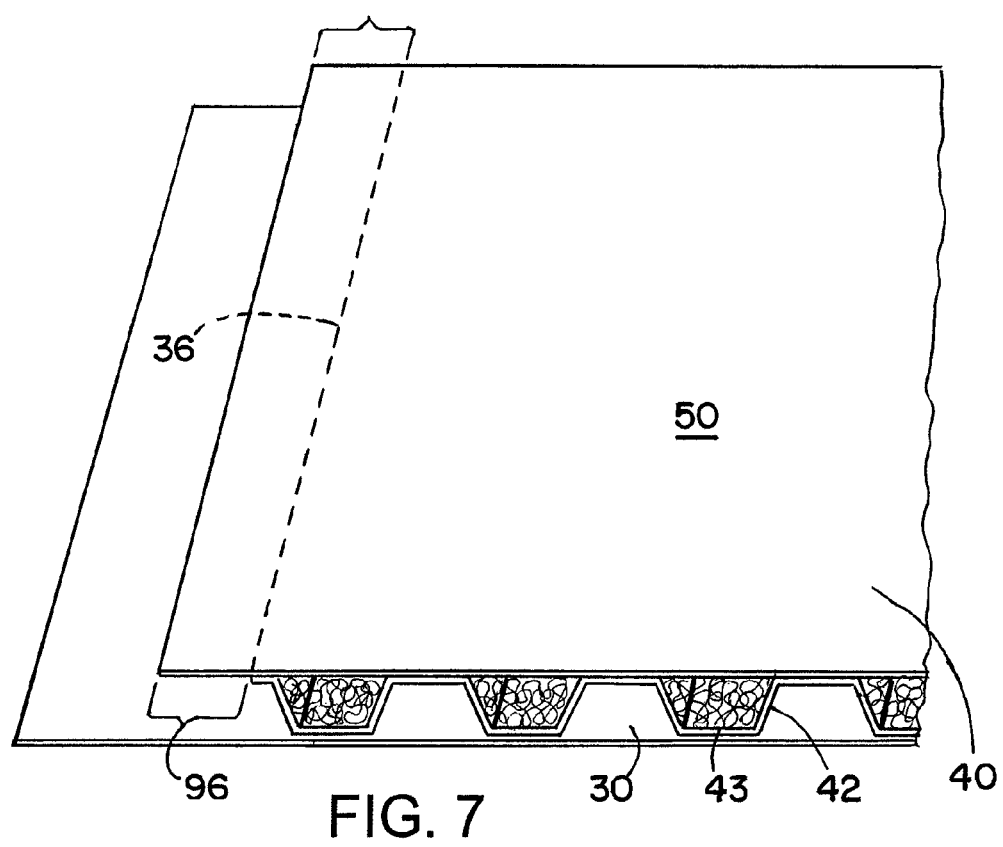
FIG. 7 is a cross-sectional view of an embodiment of the drainage mat that includes a waterproof membrane.

Referring to FIG. 7, the drainage mat 40 may include a waterproof membrane 30 adjacent the front face 43 of the web 42. The waterproof membrane 30 may be used alone on the web 42, or may be used together with the fabric layer 50 on the opposite face of the web 42. The waterproof membrane 30 may be both liquid and moisture vapor impermeable. Alternatively, the membrane 30 may be a breathable membrane that is impermeable to liquid.

In one embodiment, the drainage mat 40 is bonded to a fabric layer 50 having a width that is greater than the width of the monofilament web 42 to create a selvedge edge 96 on one or both of web side edges 36 and 38.

Figure 8:
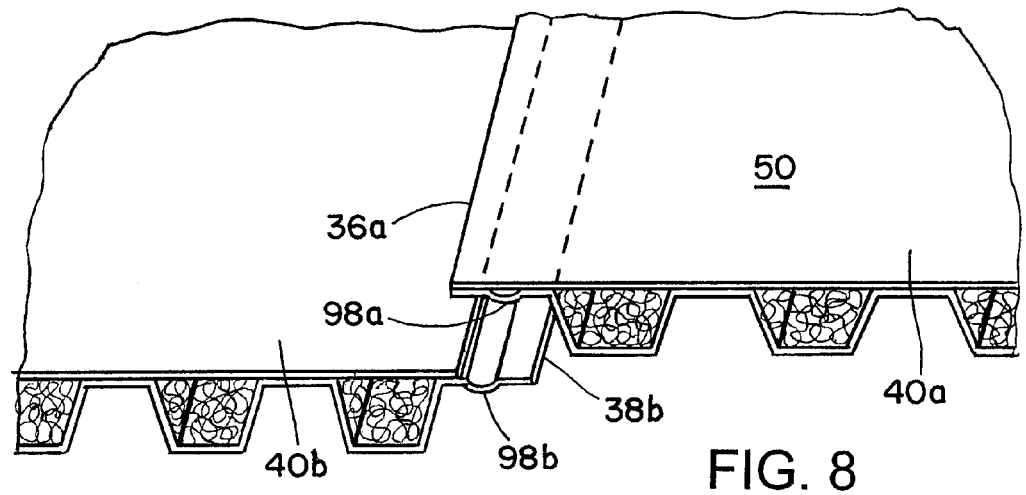
FIG. 8 is a perspective view of two drainage mats that include interlocking filament hooks.
Figure 9:
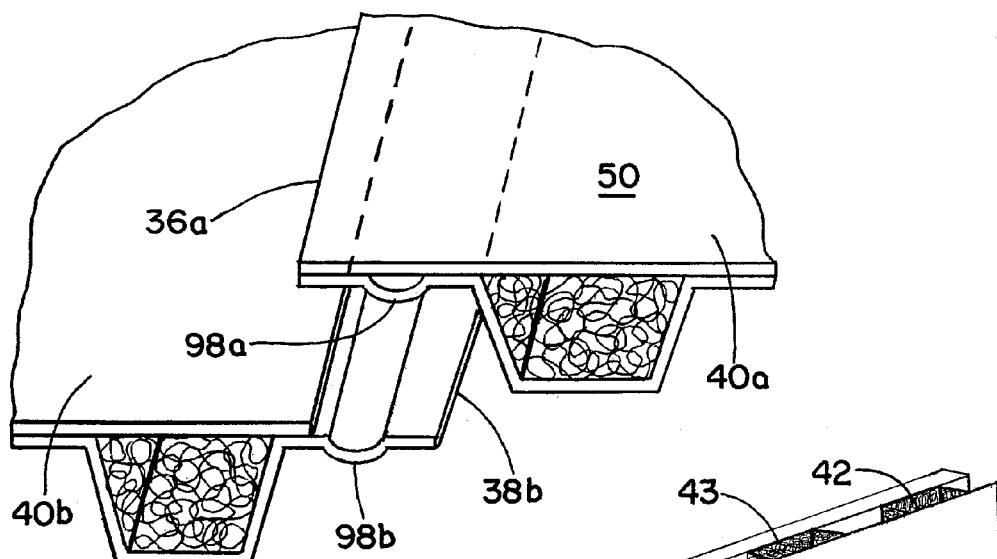
FIG. 9 is an enlarged view of the interlocking filament hooks of FIG. 8.

Referring to FIGS. 8 and 9, the drainage mat 40 may include entangled monofilament hooks 98 at one or more of web side edges 36 and 38. The hooks 98 allow adjacent drainage mats to interlock to secure the drainage mats in place within the drainage system installation. The monofilament hooks 98a on a first mat 40a, when aligned with and pressed into the monofilament hooks 98b of an adjacent second mat 40b, become entangled to secure the first mat 40a to the second mat 40b.

Figure 10:
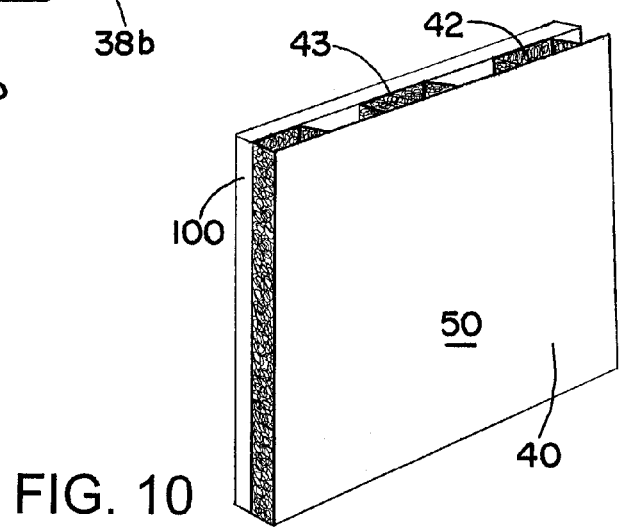
FIG. 10 is an embodiment of the drainage mat that includes an insulation board.

Referring to FIG. 10, in one embodiment, the drainage mat 40 includes an insulation board 100 bonded to the front face 43 of the web 42. The insulation board 100 may have similar dimensions to the web 42. With the insulation board 100 already bonded to the web, installation of the draining mat 40 in the cavity between an inner wythe and outer wythe (as shown in FIG. 5) is facilitated.

In addition to its usefulness as a drainage mat, the polymer monofilament web described herein may be used in applications such as roofing ventilation, erosion control, foundation drainage and sound control.

While the invention has been explained in relation to various embodiments, it is to be understood that various modifications thereof will become apparent to those skilled in the art upon reading this specification. Therefore, it is to be understood that the invention provided herein is intended to cover such modifications as may fall within the scope of the appended claims.

The invention claimed is:

1. A drainage mat comprising:
a web of extruded polymer monofilaments, the polymer monofilaments being heat welded at junctions to form a matrix of tangled monofilaments, the web having a front face, a rear face, a top edge and a bottom edge, and a pair of side edges, the web configured to have a plurality of alternating rows of ridges and planar regions, each ridge configured to form an open elongated channel extending from the top edge to the bottom edge, each ridge having a substantially elongated trapezoidal shape with a top surface and a base, the width of the top surface being less than the width of the base.

2. The drainage mat of claim 1, wherein the width of the top surface of the ridges is less than the width of the planar regions.

3. The drainage mat of claim 1, wherein at least one of the ridges has a planar top surface.

4. The drainage mat of claim 1, wherein at least one of the ridges has a dome shaped top surface.

5. The drainage mat of claim 1 wherein the polymer monofilaments are made of a material selected from polyolefin, polyamide, polyester, polyvinylhalide, polystyrene, polyvinylester and a mixture of two or more thereof.

6. The drainage mat of claim 1 wherein the polymer monofilaments are made of a material selected from polyethylene, polypropylene, and a mixture thereof.

7. The drainage mat of claim 1 wherein the polymer monofilaments have an average diameter in the range from about 1 to about 4 mils.

8. The drainage mat of claim 1 further comprising a waterproof membrane bonded to the front face of the web.

9. The drainage mat of claim 1 wherein at least one of the side edges of the web has an entangled filament hook.

10. The drainage mat of claim 1 wherein the top edge of the web is cut at an angle and the bottom edge of the web is cut at a supplementary angle.

11. The drainage mat of claim 1 wherein the front face of the web is bonded to an insulation board having the same dimensions as the monofilament web.

12. The drainage mat of claim 1 further comprising a fabric layer heat bonded to the rear face of the web.

13. The drainage mat of claim 12 wherein the fabric layer comprises a plurality of fiberglass strands.

14. The drainage mat of claim 12 wherein the fabric layer includes at least one selvedge edge that extends beyond at least one of the side edges of the web.

15. The drainage mat of claim 12 further comprising a waterproof membrane bonded to the front face of the web.

16. A drainage system comprising at least two adjacent drainage mats in accordance with claim 1.

17. The drainage system of claim 16 wherein the at least two adjacent drainage mats each have an interlocking side edge member.

* * * * *